US007640531B1

(12) United States Patent
Akram et al.

(10) Patent No.: US 7,640,531 B1
(45) Date of Patent: Dec. 29, 2009

(54) PRODUCTIVITY MEASUREMENT AND MANAGEMENT TOOL

(75) Inventors: Abdul G. Akram, Grandview, MO (US); Bill G. Branch, Jr., Shawnee, KS (US); Nalledath Vinodkrishnan, Overland Park, KS (US); Lavanya Srinivasan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 695 days.

(21) Appl. No.: 10/867,074

(22) Filed: Jun. 14, 2004

(51) Int. Cl.
  *G06F 9/44* (2006.01)
(52) U.S. Cl. .................... 717/101; 717/100
(58) Field of Classification Search ........... 705/400; 717/100, 101
  See application file for complete search history.

(56) References Cited

U.S. PATENT DOCUMENTS

| | | | | |
|---|---|---|---|---|
| 5,446,895 | A * | 8/1995 | White et al. | 717/101 |
| 6,073,107 | A * | 6/2000 | Minkiewicz et al. | 705/7 |
| 6,226,792 | B1 * | 5/2001 | Goiffon et al. | 717/120 |
| 6,519,763 | B1 * | 2/2003 | Kaufer et al. | 717/101 |
| 6,550,053 | B1 * | 4/2003 | Muckley | 717/100 |
| 6,810,392 | B1 * | 10/2004 | Piggott | 706/12 |
| 6,938,007 | B1 * | 8/2005 | Iulianello et al. | 705/34 |
| 7,003,766 | B1 * | 2/2006 | Hong | 717/144 |
| 7,159,209 | B1 * | 1/2007 | Srinivasan et al. | 717/126 |
| 7,213,234 | B1 | 5/2007 | Below | |
| 7,249,051 | B1 * | 7/2007 | Jenniges et al. | 705/14 |
| 2002/0038235 | A1 * | 3/2002 | Musafia et al. | 705/11 |
| 2003/0033586 | A1 * | 2/2003 | Lawler | 717/101 |
| 2003/0070157 | A1 * | 4/2003 | Adams et al. | 717/101 |
| 2003/0192029 | A1 * | 10/2003 | Hughes | 717/101 |
| 2004/0225397 | A1 * | 11/2004 | Gotfried | 700/111 |
| 2007/0203856 | A1 * | 8/2007 | Frohnhoefer et al. | 705/400 |

OTHER PUBLICATIONS

Antoniol et al., "A Function Point Like Measure for Object-Oriented Software", 1999, Emperical Software Engineering, vol. 4, No. 3, pp. 263-287.*
Uemura et al., "Function Point Analysis Using Design Specifications Based on the Unified Modeling Language", 2001, Journal of Software Maintenance and Evolution: Research and Practice, vol. 13, Issue 4, pp. 223-243.*
Nesi et al., "Metric Framework for Object Oriented Real-Time Systems Specification Languages", 1996, J. Systems Software, vol. 34.*

(Continued)

*Primary Examiner*—Lewis A Bullock, Jr.
*Assistant Examiner*—Jue S Wang (57) ABSTRACT

A system for managing and monitoring a project to be developed is provided. The system includes a first and a second document, the first document identifies a first set of interactions between a plurality of applications. The first set of interactions identifies functionality of the project to be developed. The second document identifies a second set of interactions within at least one of the applications. The second set of interactions identifies additional functionality of the project. The system also includes a baseline document and an estimator component. The baseline document identifies existing functions of interactions between the applications and existing functions of interactions within applications. The estimator component is operable to access the first, second, and baseline document and to count a number of interactions identified in the first and second sets of interactions not identified in the baseline document of existing functions of interactions.

23 Claims, 3 Drawing Sheets

OTHER PUBLICATIONS

Smith, "The Estimation of Effort Based on Use Cases", 1999, Rational Software White Paper.*

Maxwell et al., "Benchmarking Software Development Productivity", 2000, IEEE Software.*

Fioravanti et al., "Estimation and Prediction Metrics for Adaptive Maintenance Effort of Object-Oriented Systems", 2001, IEEE Transactions on Software Engineering, vol. 27, No. 12.*

Meli, "Early and Extended Function Point: a New Method for Function Points Estimation", 1997, IFPUG Fall Conference.*

Ahmed et al. "Developing Enterprise Java Applications with J2EE and UML", Oct. 2001, Addison-Wesley Professional, Excerpts: section "Identifying the Actors", "Sequence Diagrams".*

Bittner et al. "Use Case Modeling", Aug. 20, 2002, Addison-Wesley Professional, Chapter 4.*

Software Composition Technologies, Inc., *Function Point FAQ*, Jun. 25, 1997, 30 pgs.

Carnegie Mellon University, The Software Engineering Institute (SEI), *Function Point Analysis, Software Technology Roadmap*, Jan. 9, 2004, 4 pgs.

Srinivasan, Lavanya, et al., "Function Point Analysis System and Method", U.S. Appl. No. 10/960,878, filed Oct. 7, 2004, 33 pp.

Office Action dated Jan. 22, 2008, U.S. Appl. No. 10/960,878, filed Oct. 7, 2004, 13 pp.

Srinivasan, Lavanya, et al., Enhanced Function Point Analysis,, U.S. Appl. No. 11/193,608, filed Jul. 29, 2005.

Final Office Action dated Jul. 9, 2008, 20 pages, U.S. Appl. No. 10/960,878, filed Oct. 7, 2004.

Maxwell, et al., "Collecting Data for Comparability: Benchmarking Software Development Productivity", Sep./Oct. 2001, IEEE Software, pp. 22-25.

Advisory Action dated Nov. 26, 2008, 3 pages, U.S. Appl. No. 10/960,878, filed Oct. 7, 2004.

Office Action dated Mar. 18, 2009, 20 pages, U.S. Appl. No. 10/960,878, filed Oct. 7, 2004.

Abran, A.; Robillard, P.N.; "Function points analysis: an empirical study of its measurement processes", Software Engineering, IEEE Transactions on vol. 22, Issue 12, Dec. 1996 pp. 895-910 Digital Object Identifier 10,1109/32.553638.

Uemura, T.; Kusumoto, S.; Inoue, K.; "Function point measurement tool for UML design specification", Sotware Metrics Symposium, 1999. Proceedings. Sixth International Nov. 4-6, 1999 pp. 62-69 Digital Object Identifier 10.1109/Metric.1999.809727.

Fornaciari, W, et al., "A first step towards Hw/Sw partitioning of UML specifications", Design, Automation and Test in Europe Conference and Exhibition, 2003 pp. 668-673 Digital Object Identifier 10.1109/Date.2003.1253684.

Costagliola, G, et al., "Class point: an approach for the size estimation of object-oriented systems", Software Engineering, IEEE Transactions on vol. 31, Issue 1, Jan. 2005 pp. 52-74.

Fraternali, P, et al., "Automating function point analysis with model driven development", Oct. 2006, CASCON '06: Proceedings of the 2006 conference of the Center for Advanced Studies on Collaborative research, Published by ACM.

Office Action dated Sep. 2, 2009, 31 pages, U.S. Appl. No. 11/193,608, filed on Jul. 29, 2005.

* cited by examiner

PRODUCTIVITY MEASUREMENT AND MANAGEMENT TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer software for managing development projects, and more particularly, but not by way of limitation, to a productivity measurement and management tool and method.

BACKGROUND OF THE INVENTION

It is desirable to complete development projects on time and within the budget allocated to complete the projects. Accurately estimating the level of effort (LOE), or man-hours, needed to complete the project contributes towards realistic project scheduling and project budgeting. Without an accurate LOE estimate for the project, for example, too few developers may be applied to the project and the project may be delivered late and/or over budget.

Various methods of estimating the LOE needed to complete a project have been employed with varying degrees of success. Function point analysis involves identifying and counting functionalities or function points to be delivered by a project based on a requirements document or other statement of deliverable functionality. The more function points to be delivered, the greater the LOE needed to complete the project.

Enterprises may choose to contract with independent providers to develop software functionality, a practice commonly termed outsourcing. It is desirable to measure the productivity of the outsourcing activities and to scrutinize outsourcing bids.

SUMMARY OF THE INVENTION

According to one embodiment, a method for electronically managing application development is provided. The method includes providing a first document containing a first list of functions associated with interactions between a plurality of applications, and providing a second document containing a second list of functions associated with interactions within one or more of the plurality of applications. The method provides for defining a project for development, wherein at least some of a plurality of functionalities of the project are defined based on the interactions provided in one or more of the first and second documents. The method includes providing a baseline document containing a third list of existing functions of interactions related to one or more of the applications, and generating a count reflecting a total number of functions in the first and second lists which are not associated with existing functions in the third list contained in the baseline document.

According to another embodiment, a method of managing application development is provided. The method includes maintaining, in a first document, a first list of functions to develop for an application, and maintaining, in a second document, a second list of existing functions. The method includes providing a tool that is operable to communicate with the first and second documents, and using the tool to count a number of functions in the first list. The tool is also operable to monitor the second list and reduce the count for functions in the first list having associated existing functions in the second list.

In another embodiment, a system for managing a project to be developed is provided. The system includes a first and a second document, the first document identifying a first set of interactions between a plurality of applications. The first set of interactions identifying functionality of the project to be developed. The second document identifying a second set of interactions within at least one of the applications. The second set of interactions identifying additional functionality of the project. The system also includes a baseline document and an estimator component. The baseline document identifies existing functions of interactions between the applications and existing functions of interactions within applications. The estimator component is operable to access the first, second, and baseline document and to count a number of interactions identified in the first and second sets of interactions not identified in the baseline document of existing functions of interactions.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Accurately estimating the LOE required to complete development projects, for example software development projects, has been found to be challenging. LOE estimating may occur during a planning or an analysis phase of a project. The employment of function point analysis to estimate the LOE has some disadvantages. For example, estimating LOE based on function point analysis is a highly subjective and manually intensive process. Personnel may have to analyze documents and perform the function point analysis manually, a labor intensive and time consuming activity. Additionally, the criteria for identifying function points may be ambiguous. It sometimes happens that different analysts working on the same proposed project functionality may arrive at different function point counts. The present disclosure, according to one embodiment, is directed to a tool which can automatically generate a level of effort estimate based on objective criteria. The tool allows organizations to readily and accurately identify all the functionality required by a new application or project to be developed by an outsourced supplier. The tool also identifies any of the functionality that has already been developed, such as in a previous project, to accurately assess development costs and avoid being charged by an outsourcing provider for developing functionality that may have already been developed.

A business operation point (BOP) is defined to be a communication or an interaction described in an analysis model, where the communication is between any two applications or, within an application, between any two components. A modeled communication request is a business operation point, and a modeled communication response to the request is another business operation point. The modeled communication may be a method call or an API call invoked by one application or component. The modeled communication may be a return from a method call or an API call, such as a response, provided by one application or component. Since the business operation points are defined to be part of the analysis model, counting business operation points may be performed prior to the implementation phase of the project and may be used to calculate the LOE of the implementation and deployment phase of the project. As such, the LOE based, at least in part, on the business operation points count may be used to negotiate an outsourcing contract for implementing and deploying the project. For example, the LOE may be used to define a "not to exceed" contract. Additionally, the business operation points count may be used, along with actual LOE expended to complete the project, to quantify the development productivity of the completed project.

Figure 1:
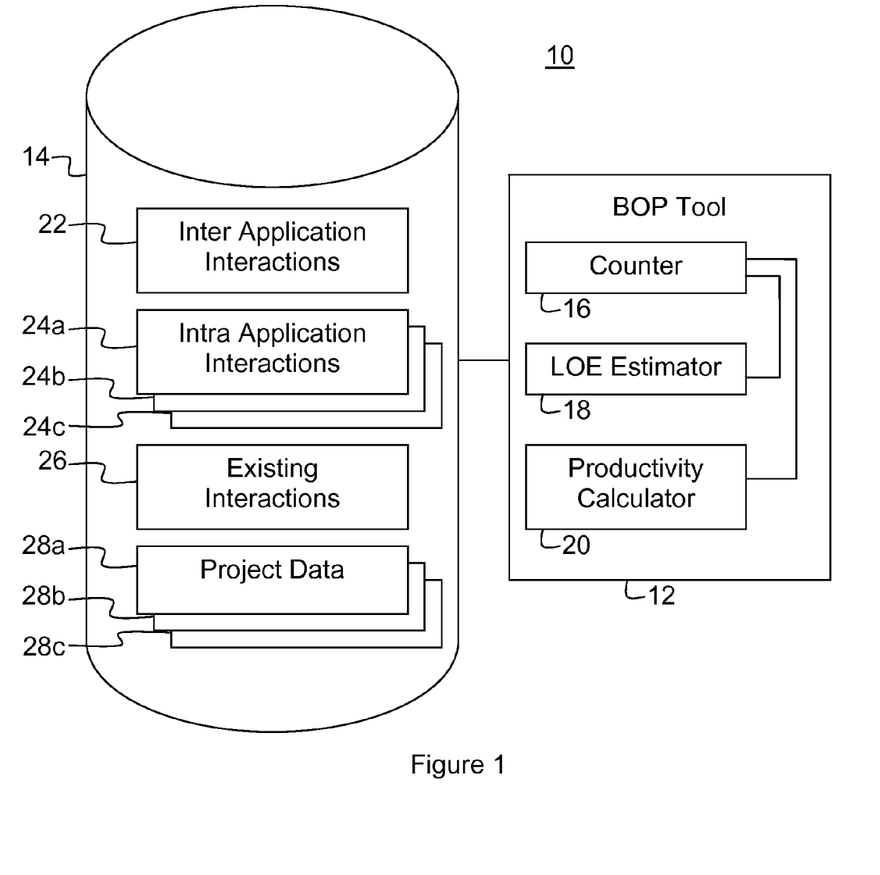
FIG. 1 is a block diagram of a business operation point system according to an embodiment.

Turning now to FIG. 1, a block diagram of a system 10 according to an embodiment of the present disclosure is depicted. A business operation point tool 12 is in communication with a database 14. The business operation point tool 12 includes a business operation point counter 16 that counts the number of business operation points associated with a model of a project. The business operation point tool 12 also includes a LOE estimator 18 that estimates the LOE associated with completing the project. The business operation point tool 12 also includes a productivity calculator 20 that calculates a productivity metric for the project. The LOE produced by the LOE estimator 18 is preferably expressed as the estimated number of development hours needed to complete the project. The business operation point tool 12 is a software application which may execute on a general purpose computer system. General purpose computer systems are discussed in detail hereinafter. In an embodiment, the business operation point counter 16, the LOE estimator 18, and the productivity calculator 20 may be separated or combined in various ways. For example, the business operation point counter 16 and LOE estimator 18 may be combined in a software component. Alternately, the business operation point counter 16, the LOE estimator 18, and the productivity calculator 20 may all be combined in a software component.

The database 14 includes an inter-application document 22 identifying interactions or communications between a plurality of applications involved in providing the functionality contemplated by the project. The applications may be existing applications which are being extended to provide new functionality. Alternately, the applications may be planned to be developed specifically for the project. The interactions between applications may be application programming interface (API) method calls.

The database 14 includes one or more intra-application documents 24—a first intra-application document 24a, a second intra-application document 24b, and a third intra-application document 24c—that identify interactions or communications within each of the applications involved in providing the functionality contemplated by the project. The database 14 includes an existing interactions document 26 which identifies existing interactions or communications between existing applications and interactions or communications within existing applications. In some cases, the existing interactions document 26 may not be provided, as when the system 10 is first deployed and there is no information on interactions available from previous projects or in a start-up software development organization.

Taken together, the inter-application document 22 and the intra-application documents 24 provide at least a part of an analysis model of the project. In some embodiments, other documents may provide other parts of the analysis model of the project. Additionally, the inter-application document 22 and the intra-application documents 24 may contain other information in addition to interactions. The existing interactions document 26 may provide at least a part of one or more analysis models associated with completed projects. In an embodiment, the interactions document 26 may be composed of a plurality of analysis model documents associated with completed projects.

The database 14 also includes a plurality of project data 28—a first project data 28a, a second project data 28b, and a third project data 28c—associated with projects. Data may be stored for completed projects, projects in a development stage, and projects in a planning stage. The project data 28 may include the business operation point count associated with a completed project and the actual LOE expended on the completed project. The project data 28 may also include the business operation point count and estimated LOE for a project in a planning stage. In an embodiment, the database 14 may be distributed across multiple storage devices and across multiple independent database systems.

The inter-application document 22, the intra-application documents 24, and the existing interactions document 26 may be manually edited specifically to support the system 10 or may be provided as one or more documents developed as part of a software development process, for example during an analysis modeling phase of the software development process. It may happen that different personnel may perform analysis modeling at different levels of detail. To promote consistency of the analysis model, which may tend to promote consistent business operation point counting and LOE estimating by the business operation point tool 12, it may be desirable to rigorously define in a process document or procedures manual the content and appropriate level of detail to be provided in the inter-application document 22 and the intra-application documents 24. An industry standard architectural model or process model, such as the enhanced telecom operations map (eTOM) in the telecommunications industry, may be employed to identify and articulate appropriate levels of detail. The project data 28 may be manually edited specifically to support the system 10 or may be provided as one or more documents developed as part of a project management effort.

The business operation point counter 16 is operable to access the database 14 and to read a plurality of interaction information from the inter-application document 22 and the intra-application documents 24 and to analyze the interaction information to count interactions identified in the interaction information as possible business operation points. The business operation point counter 16 is also operable to read the existing interactions document 26 and to compare interactions found in the existing interactions document 26 with interactions found in the inter-application document 22 and the intra-application documents 24. If an interaction counted as a possible business operation point is found in the existing interactions document 26, the possible business operation point is not counted as a new business operation point, because the subject interaction has already been developed and may be reused by the developers.

The business operation point counter 16 counts an individual business operation point only once. For example, a business operation point which may be new to the project may be employed multiple times in the project. This business operation point is only counted once in the count of business operation points. While in the preferred embodiment the business operation point count accorded an inter-application interaction or communication is weighted equal to an intra-application interaction or communication, in other embodiments inter-application interaction or communications may be weighted differently relative to an intra-application interaction or communication. The business operation point counter 16 may store the business operation point count in the project data 28 associated with the project, for example project data 28*a*.

The LOE estimator 18 generates a LOE for a project based on the business operation point count produced by the business operation point counter 16. The LOE estimator 18 may invoke the business operation point counter 16 to generate the business operation point count or may look up the business operation point count stored by the business operation point counter 16 in the project data 28, for example project data 28*a*. In one embodiment the LOE is calculated solely on the basis of the business operation point count. The LOE may be calculated as a linear function of the business operation point count, as for example LOE=k*(count of BOPs), where k is a proportionality constant. For example, one possible mapping of business operation point to LOE may be LOE=(50 hours per BOP)*(count of BOPs). The LOE imputed to each business operation point may include all implementation activities, for example building software loads, testing software loads, documenting the implementation, and other activities. Alternately, LOE may be calculated as a non-linear function of the business operation point count, for example using a look-up table where the proportionality constant k is looked up in a table based on the business operation point count.

In another embodiment, the LOE is calculated based on the business operation point count and project data 28 associated with completed projects stored in the database 14. The project data 28 may be averaged across all completed projects to produce a simple average LOE per business operation point number. Alternately, projects may be categorized, and the completed project data 28 may be selected to employ only data from completed projects that are similar to the project being estimated. The business operation point tool 12 may permit an operator to select specific completed projects from the project data 28 to use in calculating the LOE. The process of using data from the project data 28 to adjust the calculation of LOE may be termed calibrating the LOE calculation. In an embodiment, the LOE calculation may be adjusted based on the type of software being developed, for example embedded type software, mission critical type software, non-mission critical type software, information technology type software, banking transaction type software, and other definable types of software. Adjusting the calculation of LOE based on the type of software may also be termed calibrating the LOE calculation.

In an embodiment, the business operation points are partitioned into two types of data business operations and three types of transaction business operations. Data type business operations may include internal logical files type of business operations points and external interfaces files type of business operation points. Transaction type business operations may include external inputs type of business operation points, external outputs type of business operations points, and external queries type of business operations points. The LOE estimator 18 may calculate LOE based partly on the business operation point types. For example, the LOE may be calculated as:

LOE=(count of BOP type1)*$k_1$+(count of BOP type2)*$k_2$+(count of BOP type3)*$k_3$+(count of BOP type4)*$k_4$+(count of BOP type5)*$k_5$ where $k_1$ is the proportionality constant associated with the first type of data business operation point, and so on where $k_x$ is the proportionality constant associated with the relative business operation point type. In some embodiments, either more or fewer types of business operation points may be supported. Those skilled in the art will appreciate that the several alternative methods of calculating LOE described above may readily be extended to apply to the case of multiple business operation point types.

The productivity calculator 20 calculates a productivity metric for a completed project that relates the actual LOE expended to complete the project to the business operation points delivered by the project. When a project has been completed, both the count of business operation points implemented by the project and the actual LOE expended to complete the project may be saved in an appropriate project data 28, for example the project data 28*a*. The productivity calculator 20 is operable to access the database 14 and to read the project data 28, for example the project data 28*a*. The count of business operation points implemented by the project and the actual LOE expended on the project are read from the project data 28, and the productivity metric is calculated. In one embodiment a productivity index (PI) is calculated as:

PI=LOE/(count of BOPs)

Productivity is improved as the value of PI decreases

Related productivity metrics may also be calculated by the productivity calculator 20. For example, a productivity change rate in percent may be calculated to indicate whether productivity is increasing or decreasing and to what degree. In one embodiment, the productivity rate of change is calculated as:

Productivity rate of change=[(PI(*n*)/PI(*n*−1))−1]*100 where PI(n) is the productivity of the n-th completed project and PI(n−1) is the productivity of the project completed just before the n-th completed project. Other productivity metrics readily suggest themselves to those skilled in the art, and all such productivity metrics based on business operation points are contemplated by the present disclosure.

The business operation point tool 12 automates the process of sizing a project, such as estimating the LOE for implementing a project, which is less expensive and time consuming than manual LOE estimation techniques. The business operation point tool 12 provides repeatable, objective results. Where a development organization currently prepares detailed analysis models as a part of the development process, the data that the business operation point tool 12 analyzes to generate the business operation point count and the LOE estimate are already available. Additionally, the analysis model is timely available to provide the business operation point count and the LOE estimate when it is needed to provide input to an outsourcing contract negotiation. While some of the above discussion was drawn to examples from the software development art, the business operation point tool 12 may be employed with any project with access to a detailed analysis model during the project planning phase.

The business operation point tool 12 may be employed in a variety of manners at various times during the development process, as will readily suggest themselves to one skilled in the art. The business operation point count may be generated and the productivity index PI may be calculated at various points, such as part way through a project or development effort is to evaluate whether the project or development effort is making good progress or to determine whether a problem exists and corrective action should be taken. Various progress metrics based on the count of business operation points completed versus the count of business operation points total may be calculated.

Also, in some embodiments, the business operation point count may be used directly to set an outsourcing price. For example, each business operation point may be associated with a development cost and the net count may be multiplied times the cost per business operation point to obtain the outsourcing price for the development. It will be appreciated that numerous other factors associated with application development and well known to those skilled in the art may be included in this calculation as well. The productivity rate of change metric described above may be used to mandate productivity improvements to the outsourcing firm or to design incentive packages for outsourcing firms. All of these uses for the business operation point tool 12 are contemplated by the present disclosure.

Figure 2:
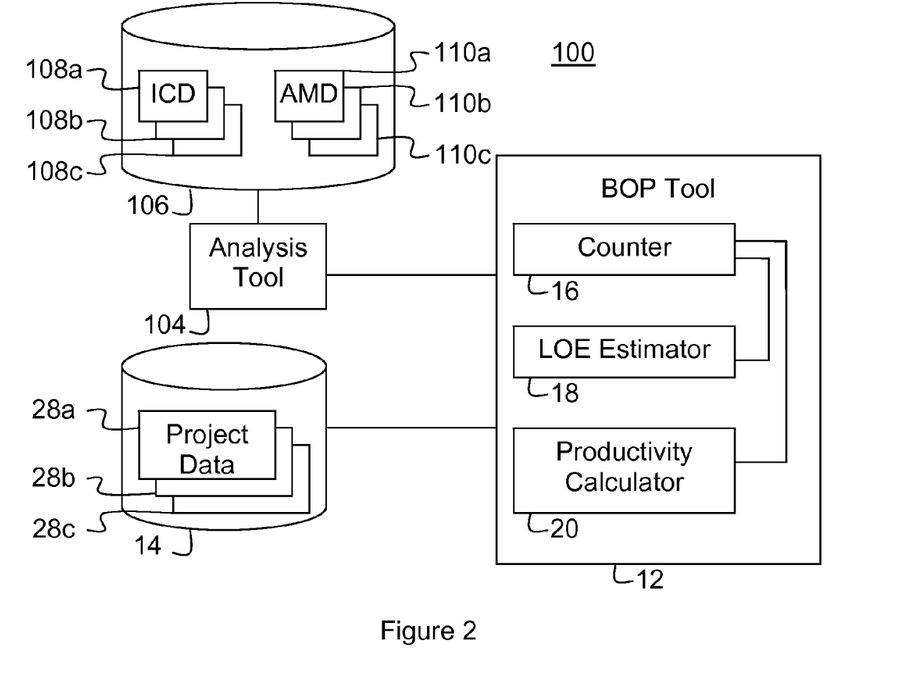
FIG. 2 is a block diagram of the business operation point system according to another embodiment.

Turning now to FIG. 2, a block diagram of the system 100 according to another embodiment is depicted. The business operation point tool 12 is in communication with a computer aided software engineering (CASE) tool 104 used to perform analysis model activities. The CASE tool 104 is in communication with an analysis model database 106. The analysis model database 106 contains a plurality of interface control documents (ICDs) 108 and a plurality of application model documents (AMDs) 110. The ICDs 108 identify inter-application interactions, for example in the form of sequence diagrams. The AMDs 110 identify intra-application interactions, for example in the form of sequence diagrams. Sequence diagrams, also known as message sequence diagrams, graphically depict communications between applications, between software components, between classes or objects, or other software entities. Sequence diagrams also graphically depict the temporal relationship or sequence of the communications. Both the ICDs 108 and the AMDs 110 may contain additional information irrelevant to the system 100. The ICDs 108 and the AMDs 110 may be associated with completed projects, projects in the implementation phase, and projects in the analysis phase. The ICDs 108 and AMDs 110 taken together represent the analysis model of the project.

The CASE tool 104 is employed to create and to maintain the ICDs 108 and the AMDs 110. In an embodiment, the CASE tool 104 aligns with or supports a unified modeling language (UML) based analysis methodology. Linking the business operation point tool 12 with the CASE tool 104 may leverage the benefits of the CASE tool 104 and may also further enforce the analysis model approach to software development.

The business operation point counter 16 may access the ICDs 108 and the AMDs 110 by accessing the analysis model database 106 directly or indirectly via the CASE tool 104. The functionality and communications of the LOE estimator 18 and the productivity calculator 20 are substantially similar to the system 10 described above. In an embodiment, an interface for accessing and controlling the business operation point tool 12 may be added into the interface of the CASE tool 104. In an embodiment, the CASE tool 104 is an IBM RationalRose® CASE tool. The CASE tool 104 may be used to identify current or new projects and, using the ICDs 108 and/or AMDs 110, determine the functionality required to enable a new application, for example. This functionality may be associated with the business operation points, which may be identified using the business operation point counter 16. Also, whether any of the business operation points have been previously developed may be determined by the business operation point tool 12 by referencing the, for example prior project data 28 and/or existing interactions document 26. By calculating the business operation points for the new project or application, and subtracting those already developed, an accurate estimate of the time and/or cost may be developed. The business operation points may be counted independent of the coding implementation language, for example Java, C, COBOL, or other languages. Also adjustment factors to account for complexity based on platform dependence and automating the counting of the adjustment factor may be made as well.

Figure 3:
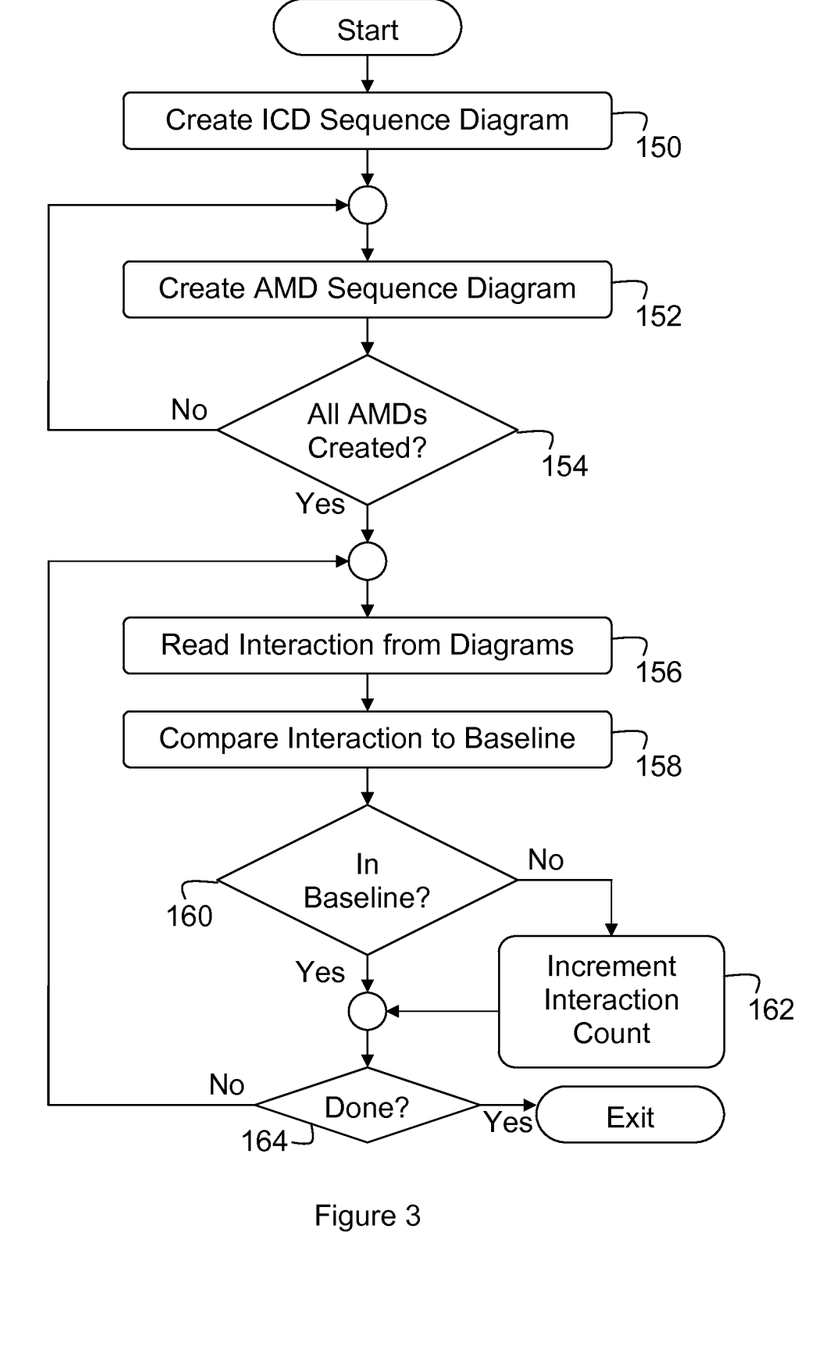
FIG. 3 is a flow chart illustrating a method of counting business operation points to size a development project.

Turning now to FIG. 3, a method for counting the new business operation points to be developed to complete the project is depicted. At block 150, a sequence diagram of the ICD 108 is created. The sequence diagram of the ICD 108 may be created using the CASE tool 104. The sequence diagram of the ICD 108 identifies interactions between applications involved in the project. In some embodiments the interactions between applications may be identified in a different document.

The method proceeds to block 152 where a sequence diagram of one AMD 110 is created, for example a first AMD 110a. The sequence diagram of the first AMD 110a may be created using the CASE tool 104. The sequence diagram of the first AMD 110a identifies interactions between components of a single application involved in the project. In some embodiments, the interactions between components of a single application may be identified in a different document.

The method proceeds to block 154 where, if there are more AMDs 110 to be created, for example a second AMD 110b and a third AMD 110c, the method returns to block 152. By looping repeatedly through blocks 152 and 154, a plurality of AMDs 110 may be created. When all AMDs 110 have been created, the method proceeds to block 156 where an interaction is read from the sequence diagrams of the ICD 108 or the AMD 110. The method proceeds to block 158 where the interaction read in block 156 is compared to all interactions which are deemed part of a baseline. The baseline may be represented by the existing interactions document 26 or may be extracted from the ICDs 108 and AMDs 110 which are located in the analysis database 106 and known to be associated with completed projects.

The method proceeds to block 160 where, if the interaction is determined to not be in the baseline, the method proceeds to block 162 where the business operation point count is incremented. The process proceeds to block 164 where, if all interactions have not been read, the process returns to block 156. In block 160, if the interaction is determined to be in the baseline, the method proceeds to block 164 and the business operation point count is not incremented.

By looping repeatedly through blocks 156, 158, 160, and 162 all business operation points are counted that do not represent business operation points already in the baseline. In block 164, when all interactions have been analyzed, the method exits and the business operation point count is final.

Figure 4:
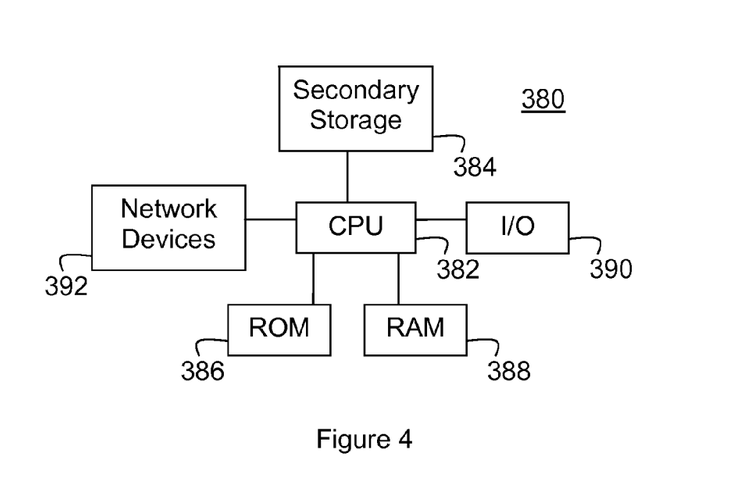
FIG. 4 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A method for electronically managing application development, comprising:

providing an interface control document containing a first set of one or more sequence diagrams that model interactions between a plurality of applications, each of the plurality of applications including a plurality of software components, classes, or objects;

providing an application model document containing a second set of one or more sequence diagrams that model interactions within one or more of the plurality of applications, wherein interactions modeled in the first set of sequence diagrams and the second set of sequence diagrams include a plurality of types of modeled interactions, the plurality of types of modeled interactions includes two or more of group consisting of internal logical files types of interactions, external interfaces files types of interactions, external inputs types of interactions, external outputs types of interactions, and external queries types of interactions;

defining a project for development, at least some of a plurality of functionalities of the project defined based on the modeled interactions provided in the interface control document and the application model document;

providing a baseline document containing a third list of existing interactions related to one or more of the plurality of applications;

generating a count reflecting a total number of business operation points based on each of the plurality of types of interactions in the interface control document and the application model document which are not associated with existing interactions in the third list contained in the baseline document, wherein the business operation points include interactions between applications and interactions within an application between components of the application, but do not include data functions of the applications or interactions with external non-application actors; and estimating a level of effort to complete the project based on multiplying the total number of business operation points based on each of the plurality of types of interactions by a corresponding proportionality constant and summing a result of the multiplying for all of the plurality of types of interactions.

2. The method of claim 1 wherein the estimating involves using information from a plurality of completed projects to map the count to the level of effort.

3. The method of claim 2, further comprising:
averaging across the plurality of completed projects to produce an average level of effort per interaction, wherein the proportionality constant is the average level of effort per interaction.

4. The method of claim 2, further comprising:
selecting, by an operator, the plurality of completed projects, wherein the plurality of selected completed projects are similar to the project.

5. The method of claim 1 wherein the estimating involves using information from one or more completed projects selected from a plurality of completed projects based on a similar type of the completed projects to the project, and wherein the information from one or more completed projects is maintained electronically.

6. The method of claim 1 further including calibrating the level of effort based on a type of the project.

7. The method of claim 1, further including calculating a productivity metric based on the level of effort expended to complete the project.

8. The method of claim 1 wherein the baseline document comprises one or more interface control documents and one or more application model documents associated with previous projects and wherein the existing interactions are further defined as identified in a plurality of sequence diagrams contained in the one or more interface control and application model documents.

9. The method of claim 1, wherein the proportionality constant is one of a linear or a non-linear proportionality constant.

10. The method of claim 1, wherein the estimation of the level of effort is adjusted based on a type of the project.

11. A system for managing a project to be developed, comprising:
an interface control document stored on a computer-readable storage medium modeling a first set of interactions between a plurality of applications through one or more sequence diagrams, the plurality of applications including a plurality of software components, classes, or objects, and the first set of interactions identifying functionality of the project;
an application model document stored on a computer-readable storage medium modeling a second set of interactions within at least one of the plurality of applications through one or more sequence diagrams, the second set of interactions identifying additional functionality of the project, wherein the first set of interactions and the second set of interactions include a plurality of types of interactions, the plurality of types of interactions includes two or more of group consisting of internal logical files types of interactions, external interfaces files types of interactions, external inputs types of interactions, external outputs types of interactions, and external queries types of interactions;
a baseline document stored on a computer-readable storage medium identifying existing interactions between the plurality of applications and existing interactions within the plurality of applications;
an estimator component stored on a computer-readable storage medium that accesses the interface control document, the application model document, and baseline document and counts a number of business operation points based on the interactions identified in the first and second sets of interactions not identified in the baseline document of existing interactions, wherein a first count of the number of business operation points based on the interactions identified in the interface control document is weighted differently relative to a second count of the number of business operation points based on the interactions in the application model document, and wherein the business operation points include interactions between applications and interactions within an application between components of the application, but do not include the components of the applications themselves or interactions with external non-application entities.

12. The system of claim 11 wherein the estimator estimates a level of effort of the project based on multiplying the count of the number of business operation points by a proportionality constant.

13. The system of claim 12 wherein the estimator calculates a productivity metric based on the count of the number of business operation points and on a level of effort expended to complete the project.

14. The system of claim 11 further including a database containing a historical information including a level of effort expended to deliver a plurality of business operation points providing functionality to a plurality of completed projects and wherein the estimator component accesses the database and estimates a level of effort of the project based on the count and on the historical information.

15. The system of claim 11 wherein the baseline document comprises one or more interface control documents and one or more application model documents and wherein the existing interactions are identified in a plurality of sequence diagrams contained in the interface control documents and the application model documents of the baseline document.

16. The system of claim 11 wherein the first and second sets of interactions are further defined as business operation points.

17. The system of claim 11, wherein at least one of the interactions identified in the first and second sets of interactions and not identified in the baseline document occur multiple times in the first or second sets of interaction, and wherein the estimator component only counts the at least one of the interactions once in the count of the number of interactions.

18. A method of managing application development, comprising:
maintaining, in a first document, a first list of interactions between a plurality of applications;
maintaining, in a second document, a second list of interactions within one or more of the plurality of applications;
maintaining, in a third document, a third list of existing interactions;
providing a tool that communicates with the first, the second, and the third documents;
using the tool to count a number of business operation points based on the interactions in the first list and the second list, the tool monitors the third list and reduces the count for interactions in the first list and the second list having associated existing interactions in the third list, wherein the first list of interactions and the second list of interactions include a plurality of types of interactions, the plurality of types of interactions includes two or more of group consisting of internal logical files types of interactions, external interfaces files types of interactions, external inputs types of interactions, external outputs types of interactions, and external queries types of interactions, and wherein the business operation points include interactions between applications and interactions within an application between components of the application, but do not include the components of the applications themselves or interactions with external non-application entities;

measuring hours expended developing the application;

calculating a productivity metric for developing the application based on a count of business operation points delivered by an outsourcing firm developing the application and the hours expended by the outsourcing firm developing the application;

calculating a productivity rate of change based on the productivity metric of the outsourcing firm for developing the one or more applications and a productivity metric of the outsourcing firm for developing a previous one or more applications; and designing incentive packages for the outsourcing firm based on the productivity rate of change.

19. The method of claim 18 wherein the interactions and existing interactions define business operations points and wherein the tool calculates the net business operation points for development of the application.

20. The method of claim 18 further comprising determining a total cost for development of the application based on the count.

21. The method of claim 18 wherein the first document is further defined as an interface control document and wherein the first list of interactions is further defined as one or more sequence diagrams within the interface control document.

22. The method of claim 18 wherein the second document is further defined as an application model document and wherein the second list of interactions is further defined as one or more sequence diagrams within the application model document.

23. The method of claim 18 wherein the third document comprises one or more interface control document and one or more application model documents each having one or more sequence diagrams related to the previously developed one or more applications.

* * * * *

UNITED STATES PATENT AND TRADEMARK OFFICE
CERTIFICATE OF CORRECTION

PATENT NO. : 7,640,531 B1  Page 1 of 1
APPLICATION NO. : 10/867074
DATED : December 29, 2009
INVENTOR(S) : Akram et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1063 days.

Signed and Sealed this

Ninth Day of November, 2010

David J. Kappos
*Director of the United States Patent and Trademark Office*